United States Patent [19]

Rosell

[11] Patent Number: 4,651,842

[45] Date of Patent: Mar. 24, 1987

[54] POWER ASSISTED STEERING SYSTEM WITH CENTRAL OUTPUT

[75] Inventor: Jorge E. Rosell, Barcelona, Spain

[73] Assignee: Bendiberica S.A., Barcelona, Spain

[21] Appl. No.: 591,612

[22] Filed: Mar. 20, 1984

[30] Foreign Application Priority Data

Mar. 22, 1983 [ES] Spain ................................. 521289

[51] Int. Cl.[4] .............................................. B62D 5/06
[52] U.S. Cl. ................................. 180/148; 74/388 PS
[58] Field of Search ............... 180/132, 148, 152, 155, 180/158, 162, 163, 147; 92/140, 151; 74/498, 422, 89.17, 407, 388 PS

[56] References Cited

U.S. PATENT DOCUMENTS

| 1,388,582 | 8/1921 | LeCampte | 74/494 |
| 1,872,714 | 8/1932 | Farley | 180/163 X |
| 2,638,850 | 5/1953 | Ferris | 92/140 |
| 2,848,056 | 8/1958 | Herbenas | 180/163 X |
| 3,444,784 | 5/1969 | Wengerd | 92/140 X |
| 3,831,697 | 8/1974 | Wahlmark | 180/148 |
| 4,146,244 | 3/1979 | Presley | 180/148 X |
| 4,296,641 | 10/1981 | May | 74/422 |
| 4,449,601 | 5/1984 | Adams | 180/148 |

FOREIGN PATENT DOCUMENTS

| 939735 | 3/1956 | Fed. Rep. of Germany | 180/148 |
| 2804656 | 8/1978 | Fed. Rep. of Germany | 180/148 |
| 2852021 | 6/1980 | Fed. Rep. of Germany | 180/148 |
| 2504485 | 10/1982 | France | 180/148 |
| 2017600 | 10/1979 | United Kingdom | 180/148 |
| 918518 | 4/1982 | U.S.S.R. | 180/148 |

Primary Examiner—Carlton R. Croyle
Assistant Examiner—Theodore Olds
Attorney, Agent, or Firm—Ronald D. Welch; Ken C. Decker; Larry J. Palguta

[57] ABSTRACT

The power assisted steering mechanism consists of a rack body (20) guided and confined to slide in the steering casing (10) and joined centrally through the lateral wall of the casing (10) by shaft components (31), to a steering linkage of a vehicle, the opposite ends (23) of the rack being joined by rods (51) to pistons (50), single or double acting, each sliding in a cylinder (41) attached to the end (11) of the casing (10) in the extension of the latter.

10 Claims, 4 Drawing Figures

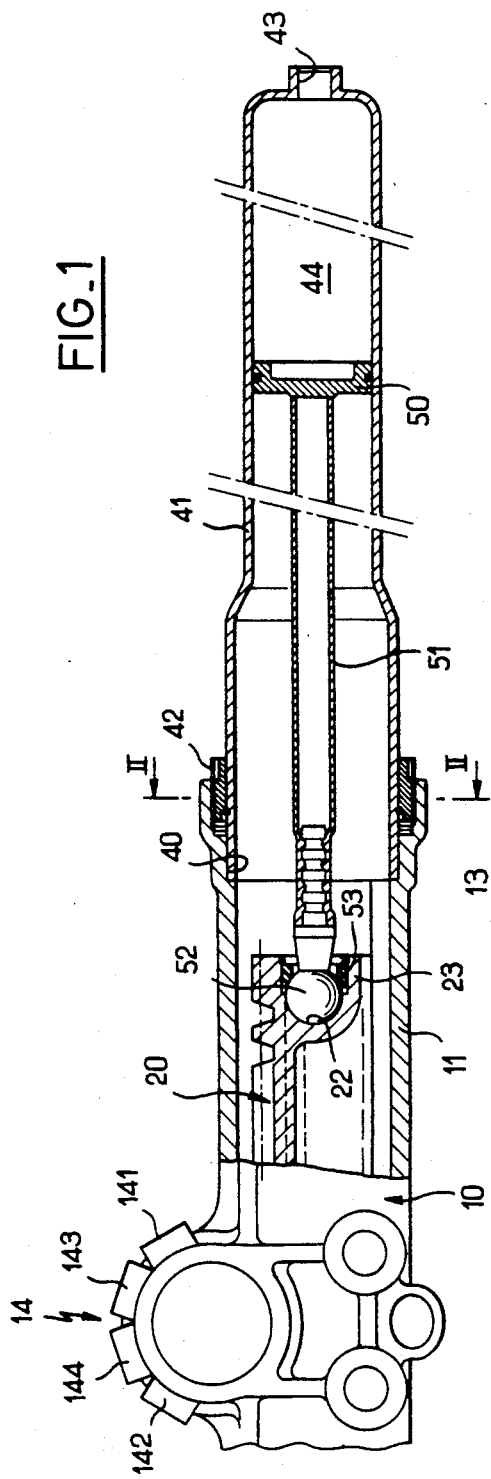
FIG_1
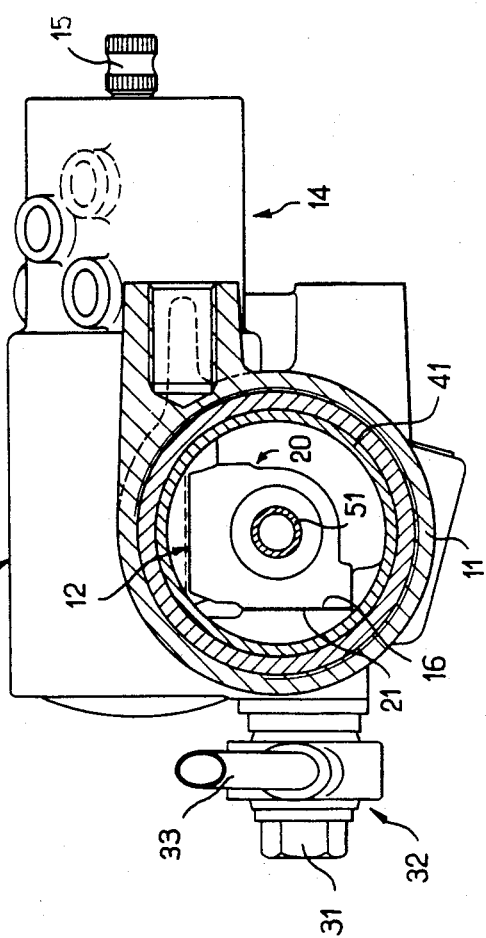
FIG_2

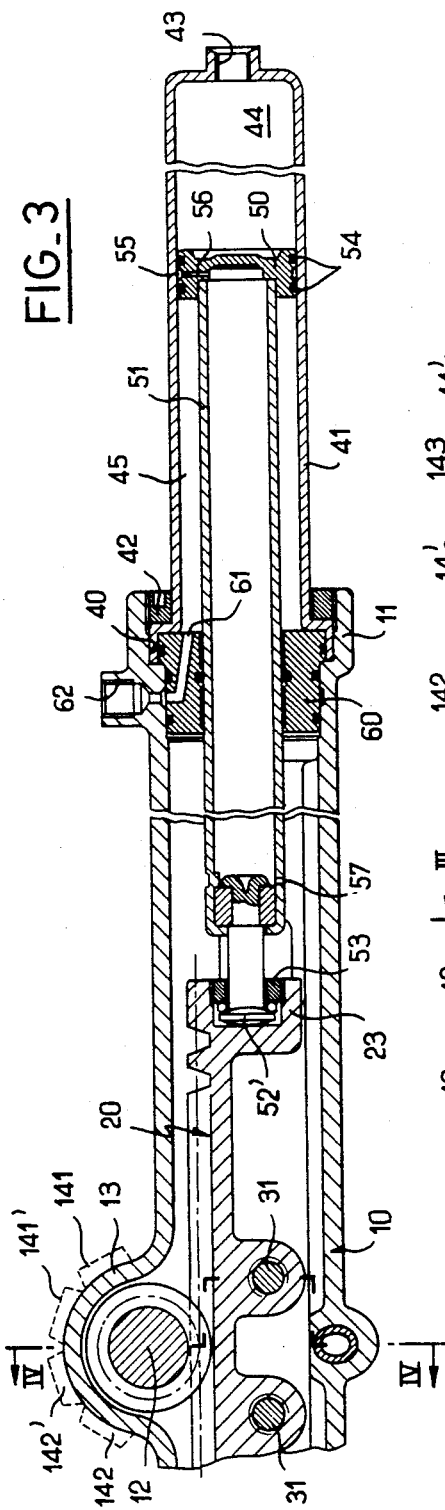
FIG_3
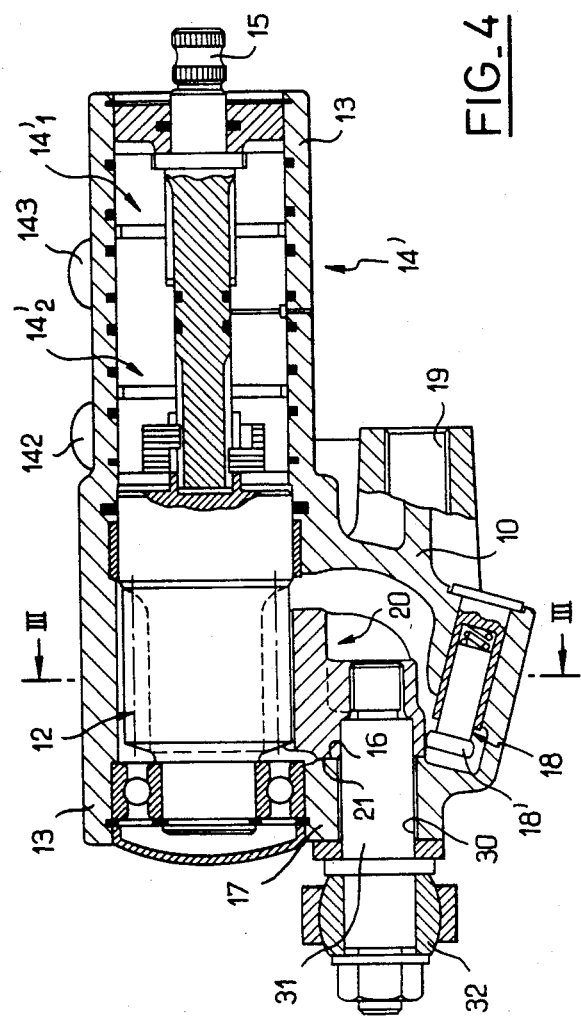
FIG_4

POWER ASSISTED STEERING SYSTEM WITH CENTRAL OUTPUT

The present invention concerns power assisted steering systems with central output, of the type incorporating a steering casing enclosing a co-operating pinion and rack mechanism, cylinder means joined to the casing and enclosing piston means joined to the rack, distribution means for conveying selectively a fluid under pressure into the cylinder means at least on the side of the piston means opposite the rack, and means for connecting the rack/piston means assembly to a linkage for steerable wheels situated at an intermediate point between the axially opposed ends of this assembly.

Power assisted steering systems with central output of the type defined above generally incorporate a double acting piston means situated in the extension of the rack, on one side of the latter, the so-called "central" connection means, of the movable rack/piston means assembly being connected to a zone at the end of the rack, to the piston rod or to the piston means for example, particularly as described in the documents FR No. 1,108,056 or U.S. Pat. No. 3,312,148. The known devices have the disadvantage of employing a relatively heavy movable assembly requiring careful manufacture and mounting. In addition, the piston itself and the piston rod combine in guiding the rack, which requires accurate alignment, not only of the cylinder and of the steering casing, but also of the different sliding seals defining the chambers of the cylinder, which increases the costs of manufacturing and assembly of the device.

The aim of the present invention is to propose a power assisted steering device of the type mentioned above, of simple and robust design, having a low inertia, and whose costs of manufacture and assembly are reduced while offering increased reliability.

To achieve this, according to a characteristic of the invention, the power assisted steering incorporates two cylinders symmetrical assembly including mounted in opposition on each side of the casing as extensions of the latter and each enclosing a piston joined by a piston rod to the adjacent end of a rack body guided in the casing, the connection means being joined to the rack body.

According to another characteristic of the invention, the rack body incorporates longitudinal a surface perpendicular to its toothed surface, bearing against a corresponding internal bearing surface of the casing.

With such an arrangement, the rack body itself is guided in the casing and, owing to the connection of the rack body to the pistons by piston rods, advantageously joined to the rack body with a mounting which is, at least initially, floating, the dimensions of the rack body can be reduced so that the longitudinal length of its toothed surface is only sufficient to obtain the necessary length of displacement, the cylinders being able to be attached to the casing without the need to observe extremely accurate alignment criteria.

According to another characteristic of the invention, the connection means, joined directly to the rack body, passes through a wall of the casing forming the said internal bearing surface, thus offering the possibility of a perfectly symmetrical arrangement which is robust and the assembly of which is simplified.

Another aim of the present invention is to propose a power assisted steering device of the type mentioned above, permitting, in association with suitable distribution means, a wide variety of potential applications without involving increased complexity of manufacture or of assembly.

To achieve this, according to one embodiment of the invention, the rod of each piston slides in a sealed manner through seal means mounted in the casing, the distribution means being provided to convey selectively a fluid under pressure into the two chambers thus defined in each cylinder on each side of the corresponding piston opposite the rack body.

With such an arrangement, each cylinder on each side of the rack is able to operate as a double acting cylinder and, it is possible either to modulate alternately, in a single circuit system, the pressure in the symmetrical pairs of chambers (that is to say acting in opposition) on each side of the rack, or to modulate sequentially, in a twin circuit system, the pressure in the chambers acting in parallel on each side of the rack, so as to take the place of the chambers acting in opposition, or to reinforce the action of the latter, according to whether, for example, the vehicle is moving along a road or is carrying out parking manoeuvres.

Other characteristics and advantages of the present invention will emerge from the following description of embodiments, given by way of illustration but not limiting in any way, with reference to the accompanying drawings, in which:

FIG. 1 shows diagrammatically a longitudinal half section of a symmetrical power assisted steering system with central output and with single circuit according to the invention;

FIG. 2 is a view in transverse section along the line 2—2 shown in FIG. 1;

FIG. 3 is a sectional view similar to that shown in FIG. 1 showing an embodiment of a power assisted steering system with central output and with twin circuits according to the invention; and FIG. 4 is a view in transverse section along the line 4—4 shown in FIG. 3.

In the description which follows, and in the drawings, identical or similar components carry the same reference numbers, with prime suffixes where appropriate.

The power assisted steering mechanism shown in FIGS. 1 and 2 generally incorporates a steering casing 10, made as a casting, incorporating two end portions 11 of cylindrical configuration. In the casing 10 a rack body 20 is mounted, cooperating in mesh with a pinion 12 mounted so as to rotate in a cylindrical housing 13 of the casing, and actuated, via a rotary distribution valve, also mounted in a tubular extension of the casing, by an input component 15 intended to be joined to the steering wheel of the vehicle.

As may be clearly seen in FIG. 2, the rack body incorporates laterally a flat surface 21, set up perpendicular to the surface carrying the teeth which cooperate with the pinion 12, and bearing so as to slide against a corresponding internal bearing surface 16 formed by a lateral wall 17 (FIG. 4) of the casing 10. The rack body 20 also incorporates a lateral surface parallel to its teeth, cooperating with an elastic reaction device 18 mounted obliquely in the casing 10 in line with the pinion 12 so as to exert on the rack body 20 a force in a direction angularly offset from the vertical to the toothed surface of the rack and advantageously provided, at its end, with a roller 18' which is able to rotate. The casing 10 is provided with means, such as 19, for firmly fixing it to a vehicle chassis.

In accordance with a feature of the invention, the wall 17 is formed with an oblong longitudinal opening 30 through which pass a pair of shaft components 31 which are fixed, at their inner ends, to the rack body 20, and which carry, at their outer ends, articulated connection means with ball and socket 32 for their connection to rods 33 of the linkage of steerable vehicle wheels. With this arrangement, the rack 20 is thus perfectly guided and maintained in engagement with the pinion 12 in the casing 10.

In accordance with the invention, a cylinder 41 is mounted in an end bore 40 of the cylindrical end 11 of the casing 10, the cylinder being made by deep stamping, for example, and retained in position by a threaded ring 42. In the internally ground end portion of the cylinder 41, a piston 50 is mounted so as to slide, joined to the rack body 20 by a hollow rod 51. The end of the rod 51 opposite the piston 50 is crimped onto the stem of a ball joint 52 mounted in a hemispherical socket 22 formed in the cylindrical end 23 of the rack body 20, and locked in position in this housing 22, in the position corresponding to a proper alignment of the piston 50 with the cylinder 41, by a locking ring 53. The external bottom end of the cylinder 41 is provided with a connector 43 intended to be connected by hydraulic hoses, tubing or the like (not shown) to the corresponding distribution outlet 141 (or 142) of the valve 14, also provided with an input connector 143, and a return connector 144 for the actuating fluid under pressure. In this way, the rotation of the input component 15 in either direction enables a pressure to be directed into the chamber 44 defined between the piston and the bottom of the corresponding cylinder 41, the pressure assisting with the displacement of the rack 20, and thus with the output components 32, 33. The mechanism is symmetrical and includes an identical cylinder and piston assembly in allochiral relation to the rack body.

The embodiment shown in FIGS. 3 and 4 also symmetrical and shown in half section, differs essentially from that described above in that it incorporates a distribution valve 14' with twin circuits incorporating, in the example shown, a series assembly, able to be actuated by the same input component 15, of a primary distribution valve 14', and a secondary distribution valve 14', and consisting, for example, of two valves with rotors in star arrangement and with springs in the shape of a C of the type described in Patent Application No. EU-A-0,077,710 in the name of the applicant company. Correspondingly, the piston 50/cylinder 41 assembly is arranged, on each side of the steering casing 10, to operate with double action. An annular seal structure 60, sliding so as to be sealed on the outer surface of the tube of enlarged diameter forming the rod 51 of the piston 50, is therefore mounted in the cylindrical end 11 of the casing 10, in abutment against the same shoulder stop as that of the cylinder 41. The annular seal structure 60 thus defines, on the side of the piston opposite the primary chamber 44, an annular secondary chamber 45 supplied through a supply passage 61 formed in the annular seal structure 60 and opening into an internal annular groove in the cylindrical end 11 of the casing 10, itself communicating with a connector 62 for connection by suitable means such as hydraulic hose or tubing (not shown) to one of the distribution outlets 141, 141' (or 142, 142') of the pair of distribution outlets of the valve 14' concerned with the corresponding actuating chambers of each piston/cylinder pair. As may be seen in FIG. 3, the piston 50 incorporates two sliding seals 54, axially spaced from one another, a peripheral groove 55 being arranged between these two seals 54 and communicating with the interior of the hollow rod 51 through a radial passage 56 formed in the thickness of the piston 50 so as to drain actuating fluid passing over either of the seals 54, this drain discharging into the casing 10 through an orifice 57 formed in the wall of the rod 51 in the region of its end connected to the rack 20. In the embodiment shown in FIG. 3, the joint allowing the correct alignment between the rack and the piston 50 to be found initially incorporates a lenticular ball end 52' pressed against the bottom of a cylindrical housing formed in the cylindrical end 23 of the rack body 20, and locked in the desired angular position by a threaded ring 53.

With such an arrangement, the twin circuit valve 14' may be arranged so as to modulate selectively the pressure in the pairs of symmetrical chambers (44 or 45) on each side of the rack, or otherwise to modulate selectively alternately the pressure in the pairs of chambers acting in parallel (44 and 45) on each side of the rack.

Although the present invention is described relative to particular embodiments, it is not limited by them, but on the contrary is capable of modifications and variants which will be apparent to a person versed in the art.

I claim:

1. A power assisted steering system with central output, comprising:
    a housing having opposite ends and a lateral wall,
    a rack body reciprocable axially in said housing, the rack body having axially opposite ends, a central portion intermediate said opposite ends and a toothed face with teeth,
    a manually actuatable pinion gear journaled in said housing and in meshing engagement with said teeth,
    a pair of integrally formed cylinder members each attached to a respective said end of said housing axially in prolongation thereof,
    a piston slidingly received within each said cylinder member and fixedly connected to one end of an elongate hollow rod and connected to the adjacent said end of said rack body by said cylindrical rod and defining in said cylinder at least an end chamber,
    each said rod being joined to the respective said end of said rack body by joining means providing, at least before final assembly, limited relative angular displacement of said rod with respect to said rack body,
    connecting means for connecting said rack body to an output linkage, said connecting means being secured to and reciprocable with said rack body and extending through an elongate aperture formed in said lateral wall
    said rack body having an outer face cooperating in bearing sliding engagement with a corresponding guiding inner surface of said housing,
    and at least one orifice in each cylinder member for admitting fluid under pressure into the respective said end chamber.

2. The system of claim 1, wherein said guiding inner surface is formed on said lateral wall, said elongate aperture opening into said guiding inner surface.

3. The system of claim 2, wherein said outer face of said rack body extends perpendicular to said toothed face.

4. The system of claim 3, further comprising a biasing member mounted in said housing and resiliently urged in contact engagement with said rack body in a direction at an intermediate angle between said faces of said rack body.

5. A system according to claim 1, wherein each said rod sealingly slidingly extends through a stationary seal means (60) mounted on the respective said end of said housing, thereby defining in each cylinder with the piston a second chamber, fluid passage means being provided for admitting fluid pressure in each said second chamber.

6. The system of claim 5, wherein said fluid passage means are formed at least partially in said seal means.

7. The system of claim 6, wherein each piston includes two peripheral axially spaced sliding seals defining between them an annular cavity, and an internal passage establishing fluid communication between said annular cavity and an internal space in said hollow rod, an intercommunication fluid passage being provided, in one region of the rod opposite the piston, for communication between said internal space and the interior of the casing (10).

8. The system of claim 5, further comprising fluid distribution means operable to selectively admit fluid under pressure in each pair of symmetrical chambers on each side axially of said rack body.

9. The system of claim 8, wherein said fluid distribution means comprises a rotary valve means arranged within said housing, coaxially with said pinion gear.

10. A power assisted steering system with central output, comprising:
   a housing having opposite ends and a lateral wall
   a rack body reciprocable axially in said housing, said rack body having axially opposite ends, a central portion intermediate said opposite ends and a toothed face with teeth,
   a manually actuatable pinion gear journaled in said housing and in meshing engagement with said teeth, an output means secured to said rack body and extending through an aperture in said lateral wall of said housing,
   a pair of integrally formed cylinder members each attached to a respective said end of said housing axially in prolongation thereof,
   a piston slidingly received within each said cylinder member and connected to the adjacent said end of said rack body by an elongate hollow cylindrical rod and defining in said cylinder at least an end chamber,
   each said rod being joined to the respective said end of said rack body by joining means providing limited relative angular displacement of said rod with respect to said rack body,
   and at least one orifice in each cylinder member for admitting fluid under pressure into the respective said end chamber.

* * * * *